(12) United States Patent
Nakano

(10) Patent No.: US 6,191,819 B1
(45) Date of Patent: *Feb. 20, 2001

(54) PICTURE-TAKING APPARATUS HAVING VIEWPOINT DETECTING MEANS

(75) Inventor: Hirofumi Nakano, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/845,364

(22) Filed: Apr. 24, 1997

Related U.S. Application Data

(63) Continuation of application No. 08/358,141, filed on Dec. 6, 1994, now abandoned.

(30) Foreign Application Priority Data

Dec. 21, 1993 (JP) .................................................... 5-346674

(51) Int. Cl.⁷ .................................................. H04N 5/222
(52) U.S. Cl. ................................. 348/333.03; 348/333.02
(58) Field of Search .................................... 348/333, 334, 348/345, 350, 333.03, 333.04, 333.02; 354/219

(56) References Cited

U.S. PATENT DOCUMENTS

| | | | |
|---|---|---|---|
| 4,595,990 | * 6/1986 | Garwin et al. | 364/518 |
| 5,253,008 | * 10/1993 | Konishi et al. | 354/219 |
| 5,541,655 | * 7/1996 | Kaneda | 348/350 |
| 5,606,390 | * 2/1997 | Arai et al. | 396/51 |

FOREIGN PATENT DOCUMENTS

| | | | |
|---|---|---|---|
| 1-241511 | 9/1989 | (JP) | G02B/7/11 |
| 2-32312 | 2/1990 | (JP) | G02B/7/28 |
| 5304631 | * 12/1992 | (JP) | H04N/5/232 |
| 5110925 | * 4/1993 | (JP) | H04N/5/232 |
| 5-183798 | 7/1993 | (JP) | H04N/5/232 |
| 5183798 | * 7/1993 | (JP) | H04N/5/232 |

* cited by examiner

*Primary Examiner*—Wendy Garber
*Assistant Examiner*—Alicia M. Harrington
(74) *Attorney, Agent, or Firm*—Fitzpatrick, Cella, Harper & Scinto

(57) ABSTRACT

Picture-taking apparatus having viewpoint detecting structure includes viewed-point detecting circuitry for detecting a viewed-point of an operator on a display screen. Area setting circuitry is provided for setting a predetermined processing area at the viewed-point detected by the viewpoint detecting circuitry. Display circuitry is provided for displaying a mark at a predetermined position on the display screen. Processing circuitry is provided for performing a predetermined function corresponding to the mark in response to a detection of the viewed-point being on a predetermined area including the display position of the mark. Control circuitry is provided for causing the area setting circuitry to inhibit displacement of the predetermined area and to freeze the predetermined area at a fixed position on the screen in the case that the display circuitry displays the mark on the display screen.

19 Claims, 9 Drawing Sheets

PICTURE-TAKING APPARATUS HAVING VIEWPOINT DETECTING MEANS

This application is a continuation of U.S. patent application Ser. No. 8/357,141, filed Dec. 6, 1994, now abandoned.

BACKGROUND OF THE INVENTION

Field of the Invention

The present invention relates to a picture-taking apparatus having the capability of detecting a point viewed by an eye of a user.

It is known in the art that the point viewed by a user is detected so that the object corresponding to the viewed-point is brought in focus (refer to, for example, Japanese Patent Laid-Open Nos. 1-241511 and 2-32312). The inventor of this invention has also proposed a selection-by-viewing technique in which marks representing various functions such as zooming, fading, etc., are displayed on a viewfinder screen of a video camera so that a user can select one of these by viewing a desired mark (Japanese Patent Application No. 4-202).

However, there are some problems in a technique in which the focus area moves to follow the viewed-point. That is, a user must always view an object to be focused. If the user makes a quick scan over the entire area of a viewing screen with his/her eye to know the features of a scene, the focus area moves quickly to follow the movement of the viewed-point, which results in an unsightly image. Even if the user tries to view an object as fixedly as he/she can, the viewed-point always moves slightly because human eyes have small movements called flicks that cannot be controlled. Therefore, the AF (autofocus) area in the viewfinder flickers following the movement of the viewed-point, which may be offensive to the eye of the user.

Furthermore, another problem occurs if the mechanism for automatically focusing an image at a moving point viewed by a user is combined with the selection-by-viewing mechanism proposed by the inventor of the present invention in Japanese Patent Application No. 4-202. That is, when the AF area is in the middle of movement to follow the point viewed by a user, if the user views a selection-by-viewing mark displayed in a peripheral area of the viewfinder to use the selection-by-viewing capability, then the AF area also moves following the movement of the viewed-point and thus an object different from the desired one is unintentionally brought in focus.

Furthermore, in tracking AF techniques used in conventional video cameras in which the focus area moves to follow a moving subject, if the subject to be focused is in an end area of the viewing screen, a user has to move the subject to the middle of the viewing screen because the focus area initially is located at the middle of the viewing screen. Moreover, if an object that is tracked by the AF mechanism crosses another object located at a distance similar to that of the tracked object, there is a possibility that the correct tracking is lost.

SUMMARY OF THE INVENTION

In view of the above, it is an object of the present invention to provide a video camera having capabilities of easy focusing and stable function selection by means of viewing.

The above object is achieved by the present invention having various aspects described below. That is, according to one aspect of the present invention, there is provided a video camera having autofocus capability or the capability of automatically focusing an object image formed in a focus area on the screen of a viewfinder, wherein the video camera comprises viewed-point detecting means that detects a plurality of points on the viewfinder screen viewed by a user and determines a representative viewed-point from the plurality of detected viewed-points using a statistical technique; and setting means for setting a focus area on the viewfinder screen or an AF frame representing the outline of the focus area such that the representative viewed-point detected by the viewed-point detecting means is positioned at the center of the focus area or the AF frame wherein the focus area or the AF frame follows the movement of the viewed-point.

In this video camera, since a representative viewed-point is given from a plurality of viewed-points, various kinds of control can be accomplished stably regardless of a certain degree of flicker in the viewed-point.

According to another aspect of the present invention, there is provided a video camera which further comprises fixing means for fixing the position of the above-described focus area or the AF frame.

With this arrangement, a user can aim his/her eye at an object on the viewfinder screen, and then can fix the focus area or the AF frame there using the fixing means. Thus, the user does not need to always view an object to be focused.

According to still another aspect of the present invention, there is provided a video camera further comprising control means for controlling the movement of the focus area or the AF frame such that when the focus area or the AF frame is fixed at a viewed-point if an object in the focus area or the AF frame moves then the control means moves the focus area or the AF frame to follow the movement of the object.

With this arrangement, when the focus area or the AF frame is fixed at a viewed-point even if an object in the focus area or the AF frame moves, the focus area or the AF frame moves following the movement of the object, thereby keeping the object within the focus area.

According to another aspect of the present invention, there is provided a video camera comprising a selection-switch-by-viewing for selecting a function in such a manner that if the viewed position stays at one of a plurality of marks indicating different functions displayed on the viewfinder screen then the function designated by the mark is activated; selection means for selecting whether the marks associated with the selection-switch-by-viewing are displayed on the viewfinder screen or not; and control means for suppressing the movement of the focus area or the AF frame even if the point viewed by a user stays at a mark as long as the marks are displayed according to the selection decision of the above selection mean.

With the above arrangement, when the marks are displayed on the viewfinder screen according to the decision of the selection means, even if the point viewed by a user stays at a mark, the above control means suppresses the movement of the AF frame of the focus area so that the focus area does not move unnecessarily.

According to a further aspect of the present invention, there is provided a video camera comprising a selection-switch-by-viewing for selecting a function in such a manner that if the viewed position stays at one of a plurality of marks indicating different functions displayed on the viewfinder screen then the function designated by the mark is activated; and control means for controlling the display of the marks associated with the selection-switch-by-viewing in such a manner that the marks are not displayed when the focus area or the AF frame is moving to follow the movement of the viewed-point, and the marks are displayed and thus the selection-switch-by-viewing becomes available when the focus area or the AF frame is fixed at a viewed-point.

With this arrangement, the marks associated with the selection-switch-by-viewing are displayed on the viewfinder screen only when the focus area or the AF frame is fixed, so that the focus area does not move unnecessarily.

DESCRIPTION OF THE PREFERRED EMBODIMENTS

Referring to the accompanying drawings, embodiments of the present invention will be described in detail.

Figure 1:
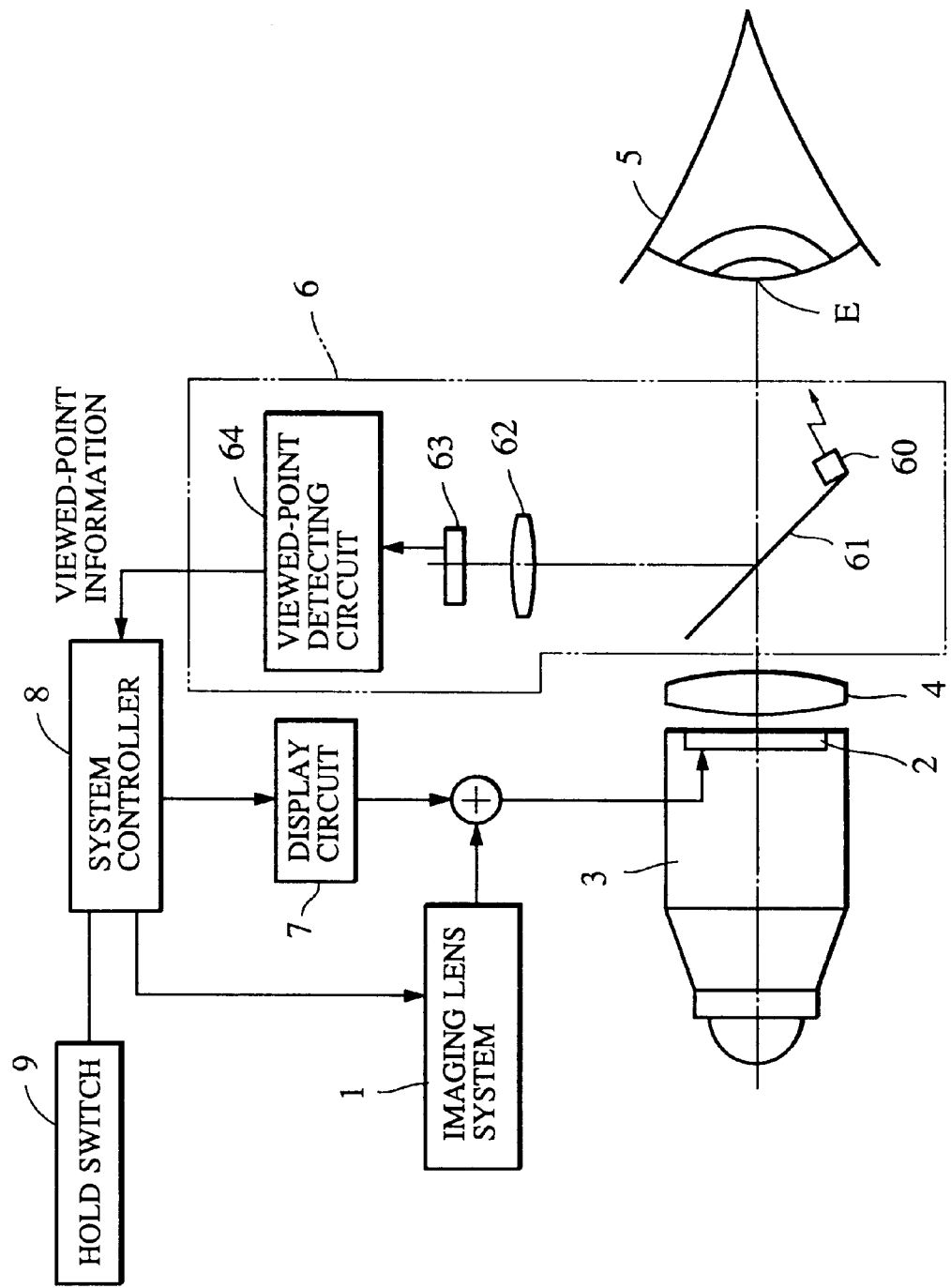
FIG. 1 is a schematic diagram illustrating an embodiment of a video camera according to the present invention.

FIG. 1 is a schematic diagram illustrating an embodiment of a video camera according to the present invention.

As shown in FIG. 1, the video camera of this embodiment substantially comprises an imaging lens system 1 including a zoom lens for forming an image of a subject; a viewfinder 3 including an electronic viewfinder screen 2, such as a liquid crystal, for observing the subject image formed by the imaging lens system 1; an eyepiece 4 disposed in front of the viewfinder 3; viewed-point detecting means 6 for detecting a point viewed by an eye 5 of a user; a display circuit 7 for displaying information on the viewfinder 2 to provide information to the user about an AF frame representing the outline of a focus area, marks associated with a selection-switch-by-viewing described later, a tape counter, an operation mode, etc.; system controlling means 8 for controlling various elements of the video camera; and a hold switch 9 for fixing the AF frame of the focus area.

The viewed-point detecting means 6 comprises an infrared light emitting diode 60 for emitting an infrared light beam toward the eye 5 of the user; a dichroic mirror 61 that reflects infrared light and that is transparent to visual light; a condensing lens 62 for condensing the infrared light reflected from the dichroic mirror 61; a photoelectric conversion element 63 for converting an image of the infrared light condensed by the condensing lens 62 to an electric image signal; and a viewed-point detecting circuit 64 for detecting a point on the viewfinder screen 2, the point being viewed by the user, the viewed-point being detected based on an image of the eye 5 of the user formed on the photoelectric conversion element 63.

Since the dichroic mirror 61 is transparent to visual light, the user can observe the viewfinder screen 2 via the eyepiece 4. Furthermore, since the dichroic mirror 61 reflects infrared light, it reflects the reflection image of the eye 5 illuminated with the infrared light emitting diode 60, and the reflected image is condensed by the condensing lens 62 thereby forming the image on the photoelectric conversion element 63.

The viewed-point detecting circuit 64 includes a memory (not shown) and determines a viewed-point on the viewfinder screen 2 from the image of the eye 5 of the user formed on the photoelectric conversion element 63 according to an. algorithm disclosed, for example, in Japanese Patent Laid-Open No. 1-241511 or 2-32312.

The viewed-point detecting circuit 64 will be described further.

Even if a user tries to view a subject as fixedly as he/she can, the viewed-point always moves slightly because the eyes of every human being have small movements called flicks that cannot be controlled. Furthermore, sometimes, a user makes a quick scan over the entire area of a viewing screen with his/her eye to know features of a scene. Thus, the point viewed by an eye of a human being always moves, and therefore if this movement of the eye is tracked in real time and directly fed back to the operation, then some problems occur in operations in conjunction with the viewed-point. For example, if the focus area moves tracking the viewed-point position, then the focusing is not fixed at a certain point but instead varies quickly.

To avoid the above problem, the viewed-point detecting circuit 64 samples a point viewed by the user a predetermined number of times to obtain a continuous series of viewed-points and determines a representative point from these viewed-points. A point representative of a plurality of viewed-points is determined by filtering a predetermined number of sampled viewed-points through a filter called a median filter.

The flow associated with the above process will be described more specifically referring to FIGS. 2 and 3.

Figure 2:
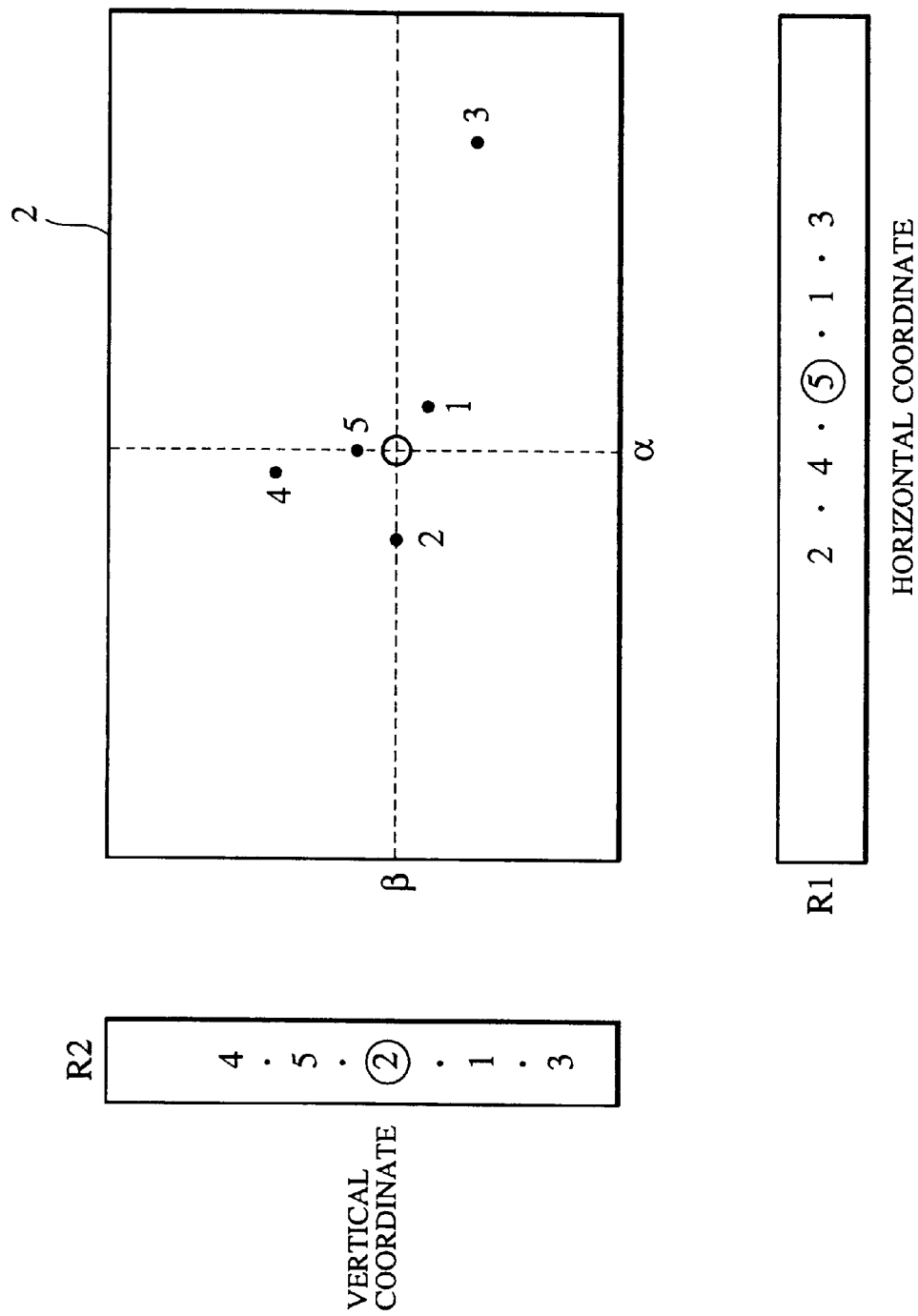
FIG. 2 is a schematic illustration of the inside of memory for storing information associated with a viewfinder screen and a viewed-point.

As an example, it is assumed here that the point viewed by a user varies on the viewfinder screen 2 as represented by reference numerals 1–5 of FIG. 2. A point representative of these five viewed-points is determined according to the steps described below. In FIG. 2, reference numerals 1 through 5 represent the time order in which the viewed-point has moved.

Figure 3:
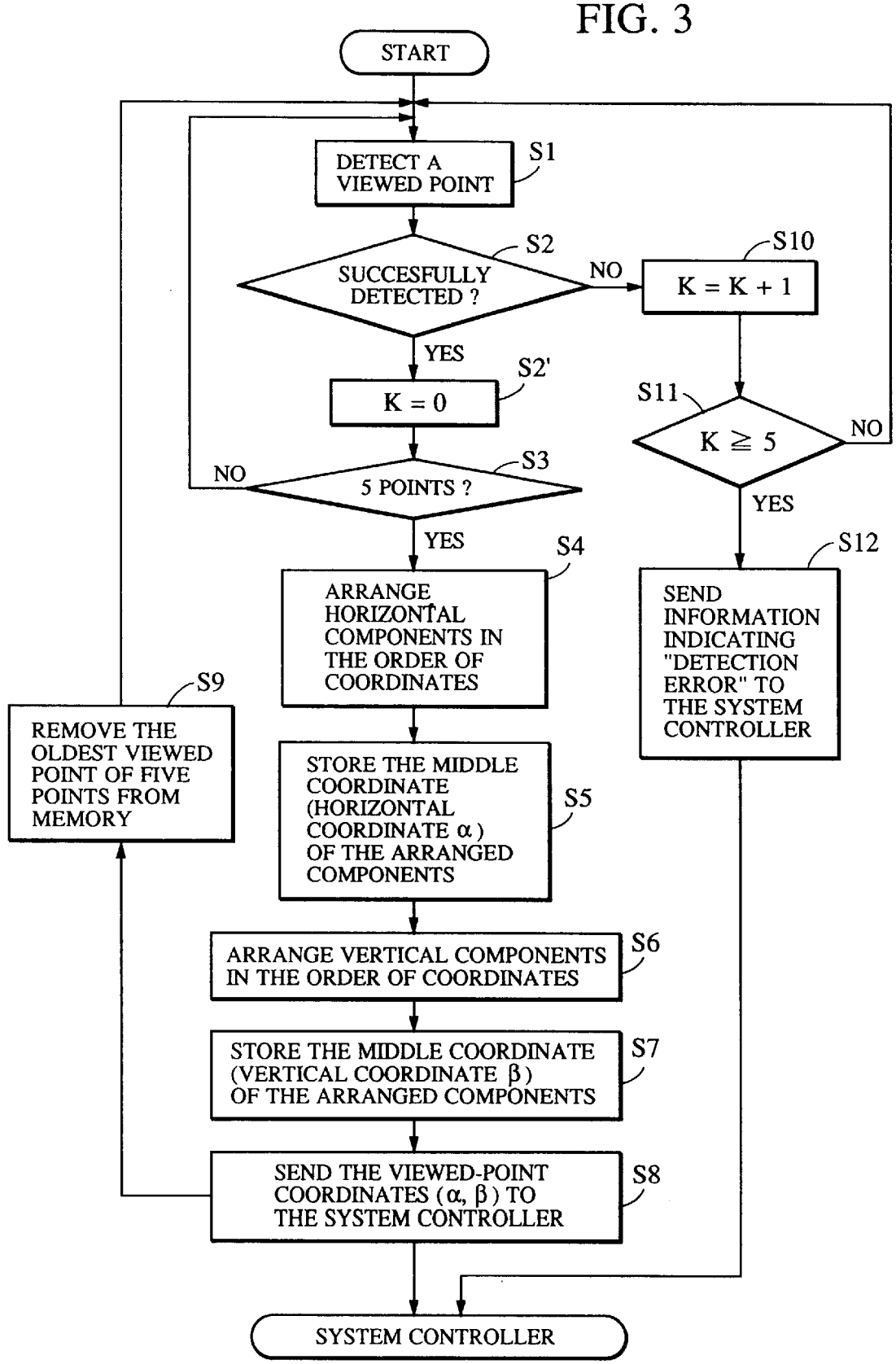
FIG. 3 is a flow chart illustrating the operation of viewed-point detecting means.

First, in steps S1 through S3 shown in FIG. 3, the process routine stores five viewed-points in memory. If the detection of a viewed-point fails, then the counter K is incremented by 1 (step S10), and the routine returns to step S1 to detect a viewed-point again. If the detection has failed continuously five times (step S11), then information indicating that the detection has failed is sent to a system controller 8 (step S12). Then, the process routine returns to step S1 to detect a viewed-point again. If the detection is successful, then the counter K is reset to 0 and the process routine proceeds to step S3 (S2').

In the above operation, if five viewed-points have been detected successfully, then horizontal components of the coordinates of the viewed-points on the viewfinder screen 2 are arranged in the order of the coordinates as represented by R1 in FIG. 2 neglecting the order in time (step S4). Then, in this case, the horizontal coordinates are arranged in the order of viewed-point numbers 2, 4, 5, 1, and 3. In this case, the viewed-point number 5 is at the middle of the line-up, and thus the horizontal coordinate α of the viewed-point number 5 is stored (step S5). Similarly, vertical components of the coordinates of the viewed-points on the viewfinder screen 2 are arranged in the order of the coordinate as represented by R2 in FIG. 2 (step S6). Then, in this case, the vertical coordinates are arranged in the order of viewed-point numbers 4, 5, 2, 1, and 3. In this case, the viewed-point number 2 is at the middle of the line-up, and thus the vertical coordinate β of the viewed-point number 2 is stored (step S7). The viewed-point detecting circuit 64 sends viewed-point coordinates (α, β) determined according to the above process flow to the system controller 8. Then, the information of the oldest one of the five viewed-points is removed from the memory (step S9), and the process routines returns to step S1 to repeat the above steps.

In the above process, the median filtering method is used. Alternatively, a simple average value of a predetermined number of coordinates of viewed-points may also be employed to determine a representative point.

The function of the selection-switch-by-viewing equipped with the video camera according to the present embodiment of the invention will be described below.

Figure 4:
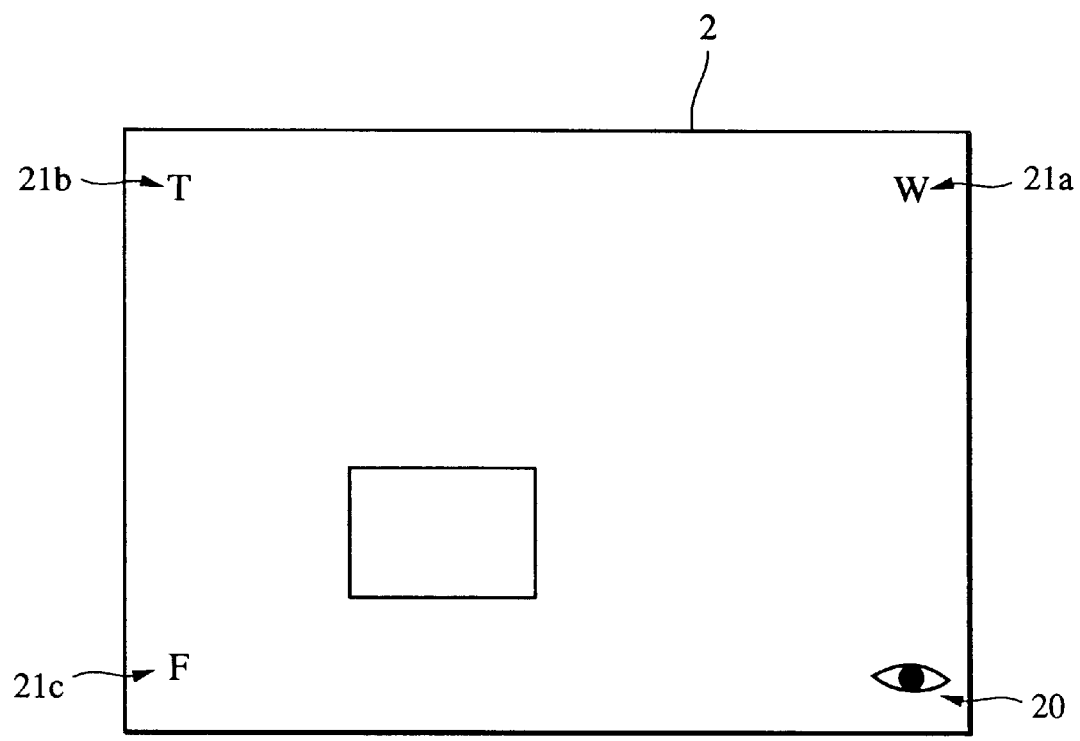
FIG. 4 is a schematic diagram illustrating a viewfinder screen used in first and second embodiments according to the present invention.

FIG. 4 is a schematic diagram illustrating an example of what is displayed on the viewfinder screen 2.

In FIG. 4, a mark 20 imitating an eye is always displayed at the bottom right corner of the viewfinder screen 2. If a user views the mark 20 imitating an eye disposed at the bottom right corner for a predetermined continuous time period, then if a menu including function marks 21 (21a, 21b, 21c) indicating different functions denoted by alphabetic symbols "W", "T", and "F" is not displayed, the menu is displayed on the viewfinder screen 2 as shown in FIG. 4. Contrarily, in the case where the menu is displayed, the menu is deleted from the viewfinder screen 2. When the menu is displayed, if a predetermined area including the function mark 21a denoted by the alphabetic symbol "W" at the top right corner on the viewfinder screen 2 is viewed continuously for a predetermined time period, then the selection-switch-by-viewing (not shown) activates a zooming function to move a zoom lens (not shown) equipped in the imaging lens system 1 of the video camera toward the wider angle side. This moving operation continues as long as the user continues viewing the function mark. Similarly, if a predetermined area including the function mark 21b denoted by the alphabetic symbol "T" at the top left corner on the viewfinder screen 2 is viewed continuously for a predetermined time period, then the selection-switch-by-viewing activates a zooming function to move a zoom lens toward the narrower angle side. If a predetermined area including the function mark 21c denoted by the alphabetic symbol "F" at the bottom left corner on the viewfinder screen 2 is viewed continuously for a predetermined time period, then the selection-switch-by-viewing activates a fading function.

Now, the function of the system control means 8 will be described referring to FIGS. 5 and 6.

When a main switch (not shown) of the video camera is turned on, the AF frame of the focus area is at the center position of the viewing screen.

Figure 5:
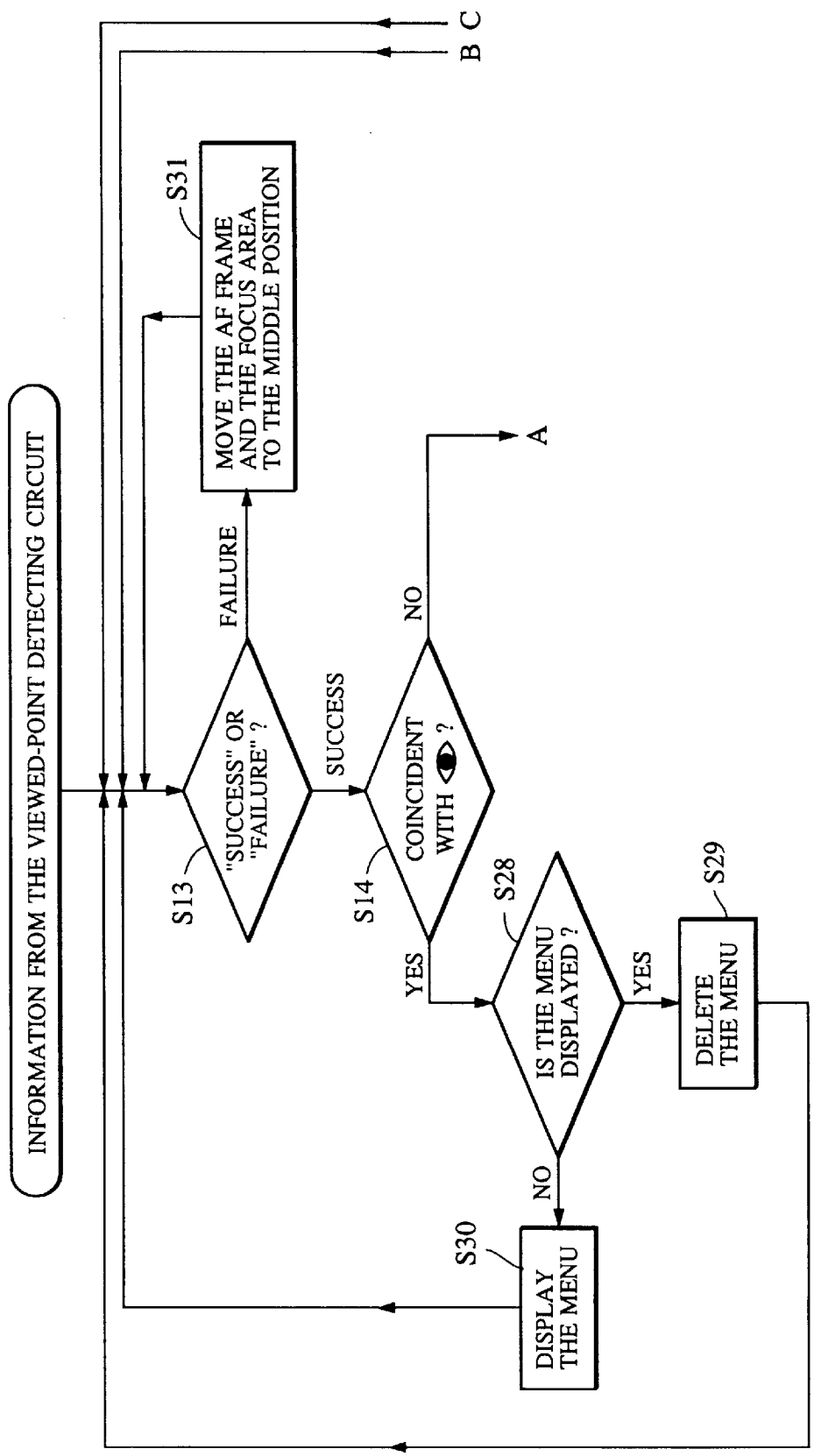
FIG. 5 is a flow chart illustrating the operation of a system controller according to the first embodiment of the invention.

If the system control means 8 receives a signal from the viewed-point detecting circuit 64, it determines whether the received signal is viewed-point coordinate information or information indicating that the detection has failed, as shown FIG. 5 (step S13). If the received signal is information indicating that the detection has failed, then the system control means 8 moves the AF frame or the focus area to the center position of the viewing screen (step S31).

Contrarily, if the received signal is viewed-point coordinate information, that is, if the detection has been performed successfully, then the system control means 8 determines whether the coordinates are nearly equal to those of eye mark 20 disposed at the bottom right corner of the viewfinder screen (step S14). If these coordinates are nearly equal to each other, then the system control mean 8 determines whether the menu including the three function marks 21 (21a, 21b, 21c) is displayed on the viewfinder screen 2 or not (step S28). Depending on the conclusion, if the menu including the function marks 21 is not displayed, then the menu is displayed, as shown in FIG. 4 (step S30), and if the menu is displayed then the menu is deleted from the viewfinder screen (step S20). Then, the process returns to step S13 to receive a new signal from the viewed-point detecting circuit 64.

Figure 6:
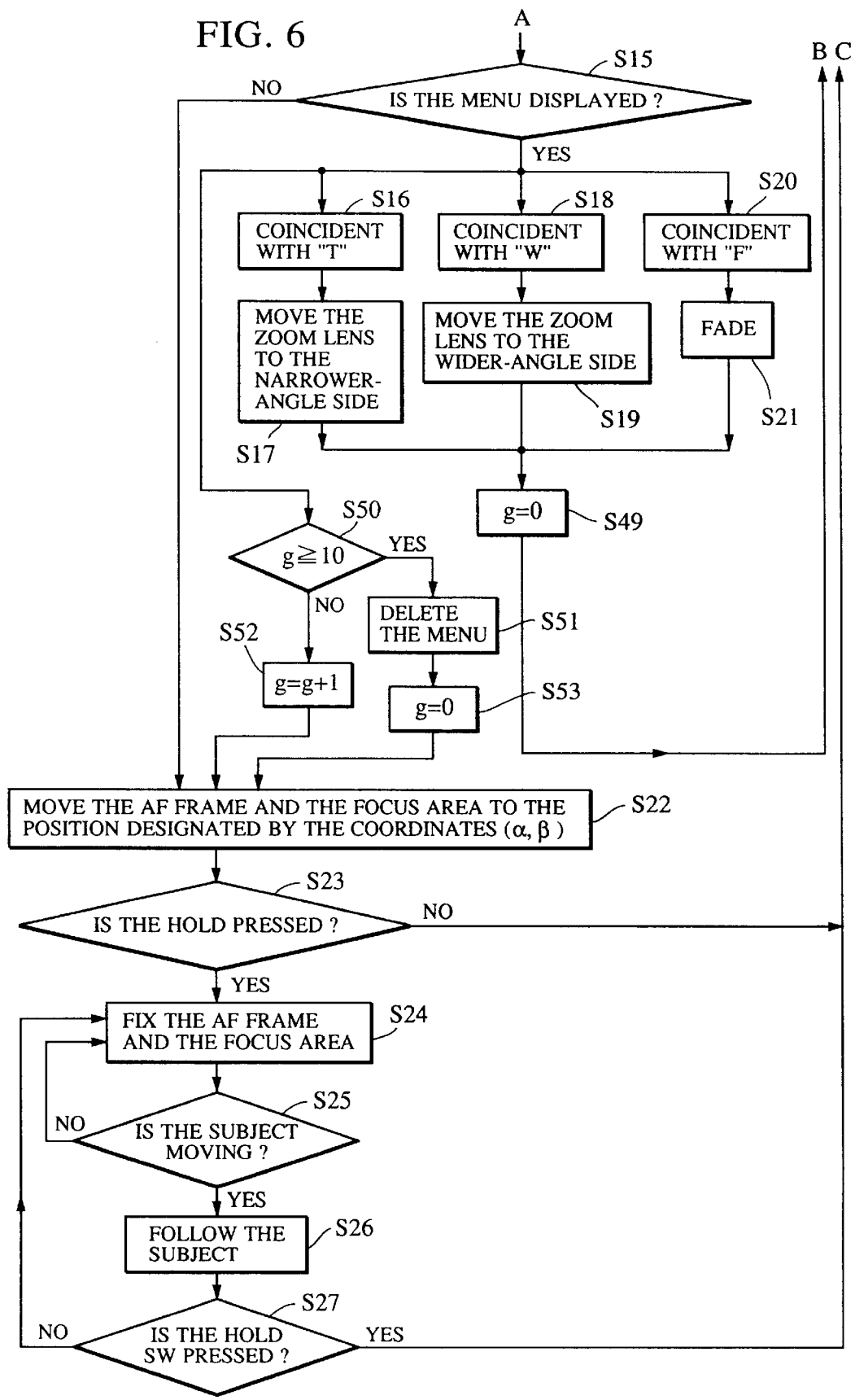
FIG. 6 is a flow chart illustrating the operation of the system controller according to the first embodiment of the invention.

In the above step S14, if the viewed-point coordinates are not equal to those of the eye mark 20 disposed at the bottom right on the viewfinder screen 2, then the process branches in the next step S15 depending on whether the menu is displayed or not, as shown in FIG. 6. If the menu is displayed and if the viewed-point coordinates are nearly equal to any coordinates of the three marks 21a, 21b, and 21b, then the system control means 8 executes a function indicated by the function mark 21 whose coordinates are coincident with those of the viewed-point (steps S17, S19, S1). Then, the counter g is reset to 0 (step S49), and the process returns to step S13.

In this case, an instruction to move the AF frame or the focus area is not issued, and therefore the AF frame or the focus area does not move and remains at the position that it has been given in just the previous process. That is, when the focus area or the AF frame is following continuously one after another the point representative of a plurality of points viewed by a user wherein the representative point is determined according to the above-described process flow, even if the point viewed by the user moves to a function mark 21 associated with the above-described selection-switch-by-viewing, the focus area or the AF frame remains or is fixed at the point the user was viewing just before he/she viewed the function mark.

Alternatively, when the point viewed by the user moves to a function mark 21 associated with the selection-switch-by-viewing, the AF frame or the focus area may also move to the center position of the viewing screen and may be fixed there as long as the point viewed by the user stays at the function mark of the selection-switch-by-viewing.

In the case where the menu is displayed, however, the viewed-point coordinates are not coincident with the coordinates of any function marks of the menu, and the system control means 8 determines whether the counter g has a value equal to or greater than 10 (step S50). If the counter g has a value equal to or greater than 10, then the menu is deleted (step S51), and then the counter g is reset to zero (step S53). Then, the process proceeds to step S22. Contrarily, if the value of the counter is less than 10, then the counter g is incremented by 1 (step S52), and then the process proceeds to step S22.

If the menu is not displayed, the AF frame or the focus area is moved to an area including, at its center position, the coordinates (α, β) provided by the viewed-point detecting circuit 64 (step S22). Then, it is determined whether the hold switch 9 is pressed or not (step S23). If it has been concluded that the hold switch 9 is not pressed, then the system control means 8 receives a new signal from the viewed-point detecting circuit 64 (step S13). In this way, according to the above process flow, the AF frame or the focus area moves continuously on the viewing screen to follow the movement of the viewed-point.

If it has been concluded in the above step S23 that the hold switch is pressed, then the AF frame or the focus area is fixed at the position the AF frame or the focus area was located at when the above conclusion was made (step S24).

If a subject rests at a certain position, the focus area may be fixed. In a video camera, however, a subject generally moves. In view of this fact, the AF frame or the focus area is adapted to move following the movement of the subject if the subject that exists in the focus area and that therefore is in focus moves when the AF frame or the focus area is fixed. That is, if the hold switch 9 is pressed and thus the AF frame or the focus area is fixed, and if the subject that exists in the focus area and that is in focus is moving (S25), then the AF frame or the focus area moves to follow the movement of the subject (S26). The means for following a moving subject does not have a direct relation with the essential features of the present invention, and therefore it will be described here only very briefly. The viewing area is divided into 16×16= 256 fields (regions). The system control means 8 calculates an ES signal (a signal representing the shape or the sharpness of a rising edge) or a contrast signal for each of the 256 fields, and determines a point at which the signal has the maximum value, that is, a point having the maximum contrast in the distance measuring frame. Then, the system control means 8 moves the distance measuring frame so that the above obtained point becomes located at the center position of the distance measuring frame. These steps S24 through S27 are performed repeatedly until the hold switch 9 is pressed again. If the hold switch 9 is pressed again, the process returns to step S13, and the system control means 8 receives a new signal from the viewed-point detecting circuit 64. Then, the above process flow is performed repeatedly as long as the viewed-point detecting function is active.

Figure 7:
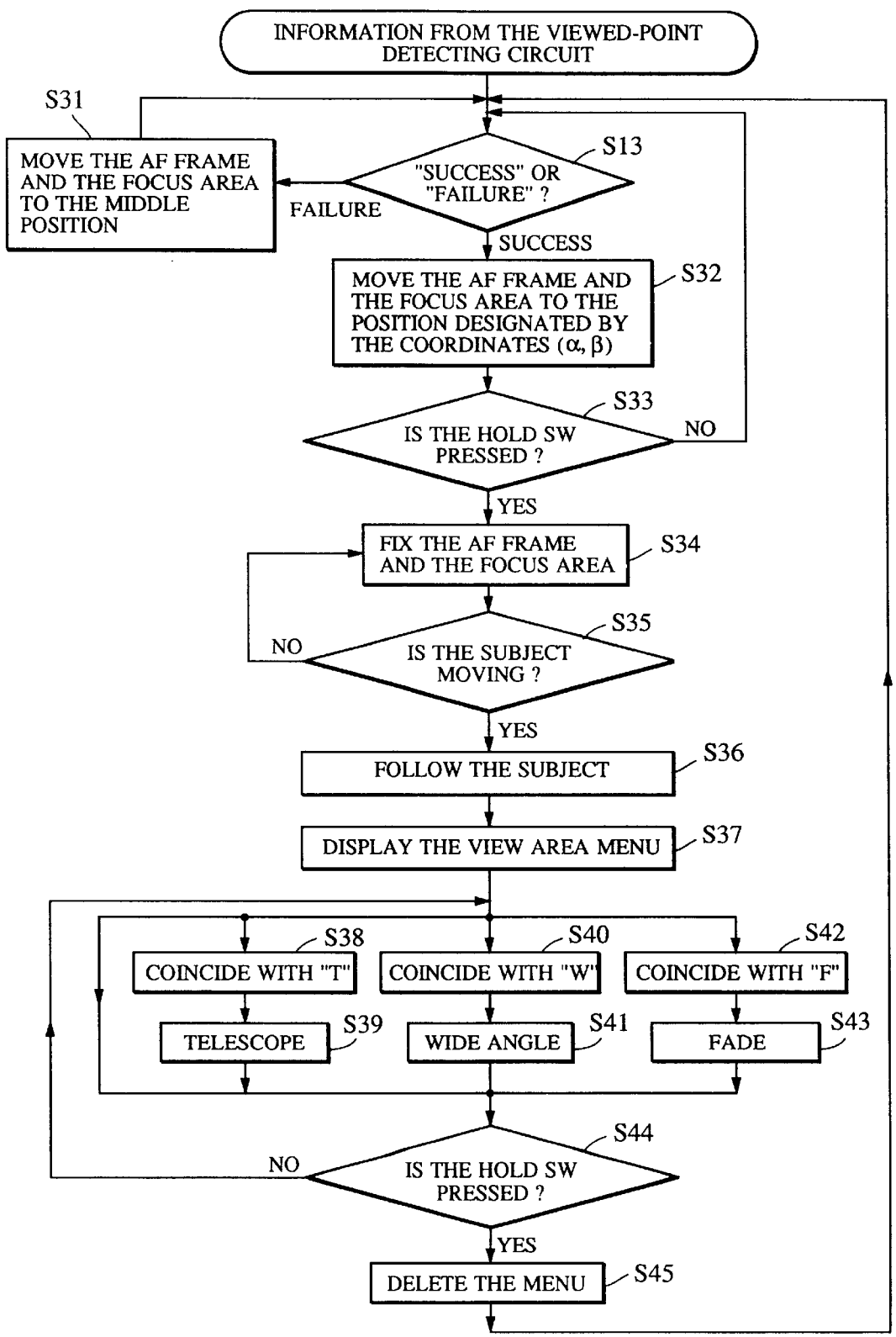
FIG. 7 is a flow chart illustrating the operation of a system controller according to the second embodiment of the invention.

FIG. 7 is a flow chart illustrating the operation associated with a video camera according to a second embodiment of the present invention.

In this second embodiment, system control means 8 operates in a different manner from that in the first embodiment described in conjunction with FIG. 1. However, the system control means 8 operates in the same manner as in the first embodiment from the beginning to the step in which the system control means receives-a signal, and therefore these steps are not described here again.

Referring to FIG. 7, the function of the system control means 8 according to the second embodiment of the present invention will be described. In this second embodiment, the menu of the selection-switch-by-viewing including the eye mark 20 that is otherwise displayed at the bottom right corner as in FIG. 4 is not displayed first on the viewfinder screen 2. Until the hold switch 9 is pressed, the process routine executes steps S13, S31, S32, and S33 in which the AF frame or the focus area is moved continuously to follow the movement of the point viewed by a user. If the hold switch 9 is pressed, then the AF frame or the focus area is fixed at the position the AF frame or the focus area was located at when the hold switch 9 was pressed. In the case where the subject in the focus area is moving the AF frame or the focus area moves following the movement of the subject (steps S34, S35, S36) in the same manner as in the first embodiment. In this second embodiment, if the AF frame or the focus area is fixed by pressing the hold switch 9, the menu of the selection-switch-by-viewing is displayed on the viewfinder screen (S37). If the coordinates of the viewed-point are nearly equal to the coordinates of any one of function marks 21 (S38, S40, S42), then the system control means 8 executes a function designates by the function mark 21 whose coordinates are nearly equal to the coordinates of the viewed-point (S39, S41, S43). If it has not been concluded in step S44 that the hold switch 9 has been pressed again, then the process routine returns to just after step 37. In this situation, the AF frame or the focus area is fixed or otherwise moving to follow the movement of the subject. If it has been concluded in step S44 that the hold switch 9 is pressed, then the menu of the selection-switch-by-viewing displayed on the viewfinder screen is deleted (S45), and the process returns to step S13.

Figure 8:
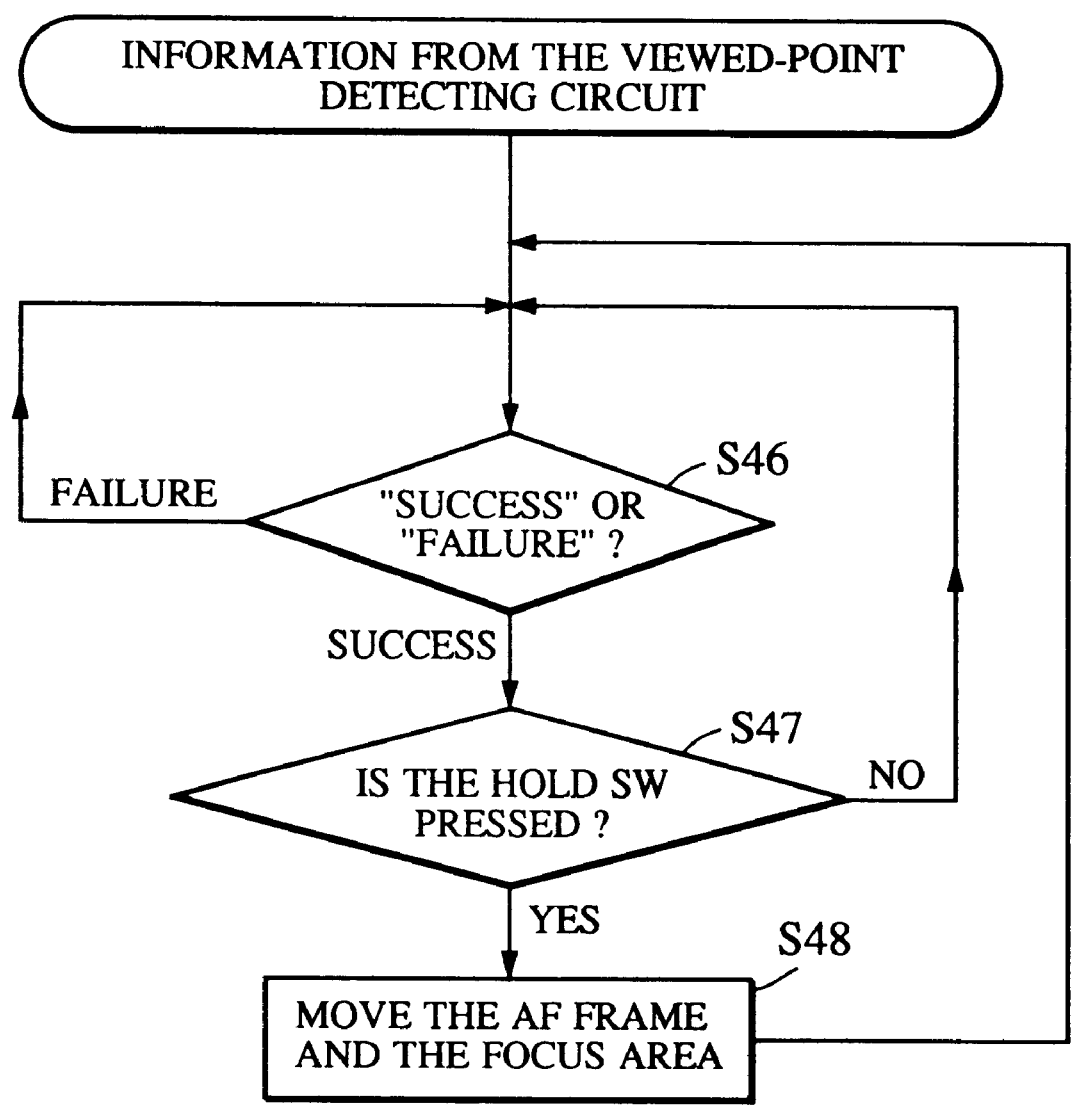
FIG. 8 is a flow chart illustrating the operation of a system controller according to a third embodiment of the invention.

FIG. 8 is a schematic diagram illustrating the operation of a video camera according to a third embodiment of the present invention.

In this third embodiment, system control means 8 operates in a different manner from that in the first embodiment described earlier in conjunction with FIG. 1. However, the system control means 8 operates in the same manner as in the first embodiment from the beginning to the step in which the system control means receives a signal, and therefore these steps are not described here again.

Referring to FIG. 8, the function of the system control means 8 according to the third embodiment of the present invention will be described. In step S46, it is determined whether a signal received from the viewed-point detecting circuit 64 is a signal representing coordinates of the viewed-point or a signal indicating that the detection has failed. In the case where the detection has failed, the process routine returns to step S45. If the received signal is a signal representing the coordinates of the viewed-point, then it is determined whether the hold switch 9 is pressed or not (S47). If it is not pressed, then the process returns to step S46. If it has been concluded in step S47 that the hold switch 9 is pressed, then the AF frame or the focus area moves to the position represented by the coordinates received from the viewed-point detecting circuit 64 at the moment the hold switch 9 was pressed, and the AF frame or the focus area is fixed there (S48). While not shown in FIG. 8, if a subject in the focus area is moving at that time, then the AF frame or the focus area may also move to follow the movement of the subject. In this case, the process is performed in the same manner as in the first embodiment. Then, the process routine returns to step S45 to perform the above process flow repeatedly.

The selection-switch-by-viewing is not described here in this third embodiment, because it does not have a direct relation with the essential features of the present embodiment, however the video camera of this embodiment may also have a selection-switch-by-viewing.

Now, a fourth embodiment of the present invention will be described. The video camera according to this fourth embodiment also has viewed-point detecting means 6 and is configured in a similar manner to that in the first embodiment, however the viewed-point detecting circuit 64 and the system control means 8 operate in different manners from those in the first embodiment.

In this fourth embodiment, the viewed-point detecting means does not have the capability of a median filter such as that described earlier in the first embodiment. Thus, when the viewed-point is detected, the resultant signal is sent directly to the system control means 8.

Figure 9:
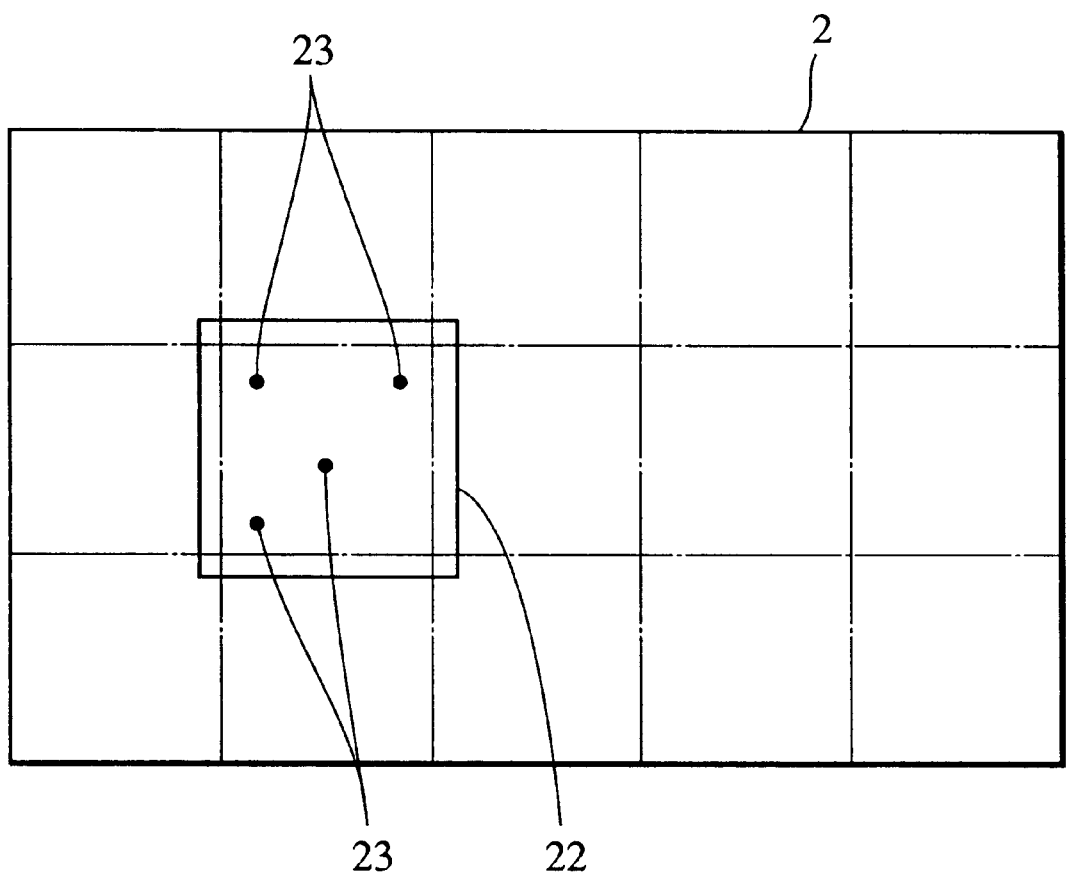
FIG. 9 is a schematic diagram illustrating a viewfinder screen according to a fourth embodiment of the invention.

FIG. 9 is a schematic diagram illustrating a viewfinder screen 2 according to the fourth embodiment of the present invention.

In the fourth embodiment, the viewing screen is divided into, for example, 5 parts in the horizontal direction and 3 parts in the vertical direction, that is, 15 parts in total. The AF frame or the focus area 22 can move only among these divisions from one to another, as shown in FIG. 9. Of these 15 divisions, the AF frame or the focus area 22 moves to a division that contains a viewed-point, and the AF frame or the focus area 22 is fixed there as long as the viewed-point 23 remains in this same division. With this arrangement, the movement of the AF frame or the focus area 22 is not influenced by the movement of the point viewed by a user as long as the magnitude of the movement of the viewed-point is less than a certain degree as in the case of physiological flickers.

As described above in detail, the present invention has various advantages. That is, since a representative viewed-point is given from a plurality of viewed-points, various kinds of control can be accomplished stably regardless of a certain degree of flicker in the viewed-point.

The focus area or the AF frame can be fixed. Thus, the user does not need to always view an object to be focused.

Even when the focus area or the AF frame is fixed, if a subject in the focus area or the AF frame moves, the focus area or the AF frame moves to follow the movement of the subject. That is, the video camera according to the present invention has the capability of automatic tracking in the AF. This means that the focus area never loses track of the subject and therefore good focus is always obtained.

When the function marks associated with the selection-switch-by-viewing area are displayed on the viewfinder screen, even if the point viewed by a user stays at a function mark, the AF frame or the focus area does not move unnecessarily.

The function marks associated with the selection-switch-by-viewing are displayed on the viewfinder screen only when the AF frame or the focus area is fixed. Therefore, the focus area does not move unnecessarily.

What is claimed is:

1. An electronic apparatus having a display screen and comprising:
   viewed-point detecting means for detecting a viewed-point of an operator in a display area which displays an input image on the display screen;
   area setting means for setting a processing area at the viewed-point in the display area detected by said viewed-point detecting means;
   display means for displaying a mark at a predetermined position, in the display area, at which the area setting means would otherwise set the processing area if the viewed-point were detected at the predetermined position;
   processing means for performing a predetermined function corresponding to the mark in response to a detection of the viewed-point being on the mark; and
   control means for causing said area setting means to inhibit displacement of the processing area and to freeze the processing area at a fixed position in the display area on the display screen according to an operation for causing said display means to display the mark in the display area on said display screen.

2. An apparatus according to claim 1, wherein said processing area comprises a focus detecting area.

3. An apparatus according to claim 2, further comprising focus detecting means for detecting a focus condition on the basis of a predetermined component in the focus detecting area.

4. An apparatus according to claim 3, wherein said processing means comprises zooming means for magnifying an image and for performing a zooming operation in response to the detection of said viewed-point detecting means.

5. An apparatus according to claim 4, wherein said mark includes at least two symbols corresponding to "tele" and "wide", respectively.

6. An apparatus according to claim 1, wherein said display means displays the mark at a corner of the display screen.

7. An apparatus according to claim 1, wherein said control means causes said processing area to be frozen at the center of said image display area on said display screen in the case that said display means displays the mark on the display screen.

8. An apparatus according to claim 1, wherein said display screen comprises a screen of an electronic view finder.

9. An electronic apparatus having a display screen and comprising:
   viewed-point detecting means for detecting a viewed-point of an operator in a display area which displays an input image on the display screen;
   area setting means for setting a processing area at the viewed-point in the display area detected by said viewed-point detecting means;
   display means for displaying a mark at a predetermined position, in the display area, at which the area setting means would otherwise set the processing area if the viewed-point were detected at the predetermined position;
   selecting means for selecting on and off operational states of said display means;
   processing means for performing a predetermined function corresponding to the mark in response to a detection of the viewed-point being on the mark; and
   control means for causing said area setting means to inhibit the displacement of said processing area by said area setting means according to an operation for causing said display means to turn on, and to inhibit the operation of said processing means according to an operation for causing said display means to turn off.

10. An apparatus according to claim 9, wherein said processing area comprises a focus detecting area.

11. An apparatus according to claim 10, further comprising focus detecting means for detecting a focus condition on the basis of a predetermined component in the focus detecting area.

12. An apparatus according to claim 11, wherein said processing means comprises zooming means for magnifying an image and for performing a zooming operation in response to the detection of said viewed-point detecting means, and wherein said mark includes at least two symbols corresponding to "tele" and "wide", respectively.

13. An apparatus according to claim 9, wherein said display means displays the mark at a corner of said display screen.

14. An apparatus according to claim 9, wherein said control means causes said processing area to be frozen at the center of said image display area on said display screen in the case that said display means displays the mark on the display screen.

15. A video camera apparatus having a view finder screen and comprising:
- viewed-point detecting means for detecting a viewed-point of an operator in a display area which displays a picked-up image on the view finder screen;
- area setting means for setting a processing area at the viewed-point in the display area detected by said viewed-point detecting means;
- displaying means for displaying the picked-up image and a mark at a predetermined position, in the display area, at which the area setting means would otherwise set the processing area if the viewed-point were detected at the predetermined position;
- processing means for performing a predetermined function corresponding to the mark in response to a detection of the viewed-point being on the mark; and
- control means for causing said area setting means to inhibit the displacement of said processing area by said area setting means according to an operation for causing said display means to display the mark, and to inhibit the operation of said processing means according to an operation for causing said display means to turn off the mark.

16. A camera according to claim 15, wherein said processing area comprises a focus detecting area.

17. A camera according to claim 16, further comprising a focus detecting means for detecting a focus condition on the basis of a predetermined component in the focus detecting area.

18. A camera according to claim 15, wherein said processing means comprises zooming means for magnifying the image and for performing a zooming operation in response to the detection of said viewed-point detecting means, and wherein said mark includes at least two symbols corresponding to "tele" and "wide", respectively.

19. A camera according to claim 15, wherein said control means causes said processing area to be frozen at the center of said image displaying area on said view finder screen in the case that said display means displays the mark on said view finder screen.

* * * * *

UNITED STATES PATENT AND TRADEMARK OFFICE
CERTIFICATE OF CORRECTION

PATENT NO. : 6,191,819 B1
DATED : February 20, 2001
INVENTOR(S) : Hirofumi Nakano It is certified that error appears in the above-identified patent and that said Letters Patent is hereby corrected as shown below:

<u>Title page,</u>
Item [56], References Cited, FOREIGN PATENT DOCUMENTS "5183798 *7/1993 (JP) ….. H04N/5/232" should be deleted. (Duplicate) "5304631" should read -- 5-304631 --; and "5110925" should read -- 5-110925 --.

<u>Column 6,</u>
Line 11, "mean" should read -- means --.

<u>Column 7,</u>
Line 50, "receives-a" should read -- receives a --.

<u>Column 8,</u>
Line 8, "designates" should read -- designated --.

Signed and Sealed this

Seventeenth Day of September, 2002

Attest:

JAMES E. ROGAN
*Attesting Officer*   *Director of the United States Patent and Trademark Office*